Patented Oct. 23, 1923.

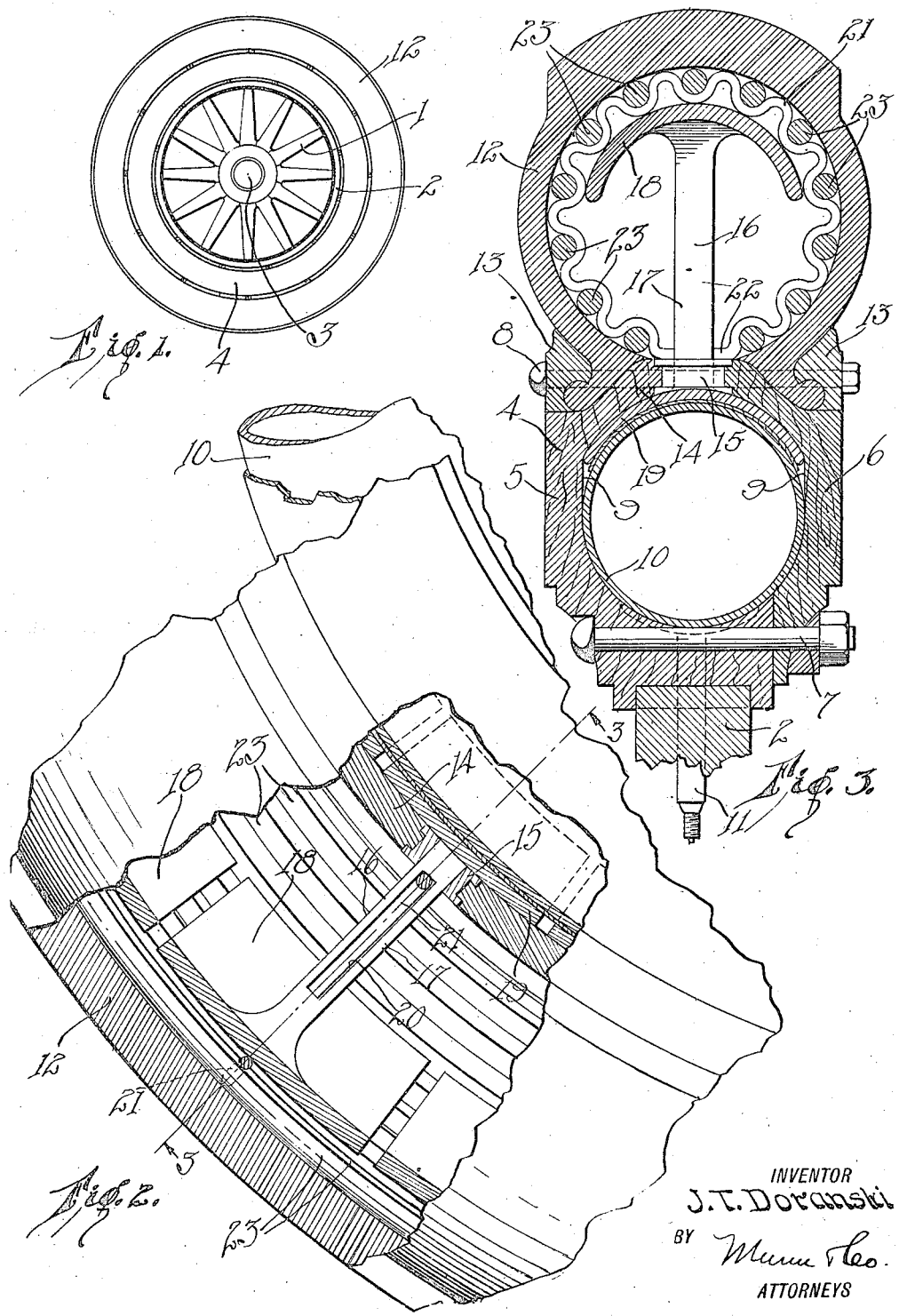

1,471,949

UNITED STATES PATENT OFFICE.

JULIUS T. DORANSKI, OF CHICAGO, ILLINOIS.

VEHICLE TIRE.

Application filed October 16, 1922. Serial No. 594,330.

*To all whom it may concern:*

Be it known that I, JULIUS T. DORANSKI, a citizen of the United States, and a resident of Chicago, in the county of Cook and State of Illinois, have invented a new and useful Improvement in Vehicle Tires, of which the following is a full, clear, and exact description.

My invention relates to improvements in vehicle tires, and more particularly to that type of tire which may not be punctured by the introduction of nails or other destructive devices through the tread or casing, and it consists in the combinations, constructions, and arrangements herein described and claimed.

An object of my invention is to provide a vehicle tire of the character described in which a pneumatic tube for attaining resiliency is employed, but in which the tube is not disposed adjacent the tread.

A further object of my invention is to provide a vehicle tire of the character described in which the pneumatic tube is encased in a rigid casing and therefore effectively shielded from mutilation as in the case of the ordinary inner tube which is disposed within the tire casing.

A further object of my invention is to provide a vehicle tire of the character described which possesses a high degree of resiliency that is practically indestructive except for the natural wear upon the tread.

A further object of my invention is to provide a vehicle tire of the character described in which the casing of which the tread is a part, may be removed and replaced without deflating or in any way adjusting the pneumatic tube, although it greatly assists the mechanic to partially deflate the tube as the casing is adjusted.

Other objects and advantages will appear in the following specification, and the novel features of the invention will be particularly pointed out in the appended claims.

My invention is illustrated in the accompanying drawings, forming part of this application, in which—

Figure 1 is a side elevation of an embodiment of my invention,

Figure 2 is an enlarged fragmentary view of a portion of the mechanism illustrated in Figure 1, and Figure 3 is a sectional view along the line 3—3 of Figure 2.

In carrying out my invention, I make use of a vehicle wheel 1 having a supporting rim 2. This supporting rim 2 is closer to the hub 3 of the wheel than in the case of the ordinary vehicle wheel, since the tire I employ is relatively deeper than the ordinary type of vehicle tire.

A wooden casing 4 comprising two parts 5 and 6 which are bolted together by means of a plurality of bolts 7 and 8, is securely fixed to the rim 2. In this case, I fix the portion 5 of the casing to the rim 2 and the portion 6 of the casing may be removed to introduce a pneumatic tube for a purpose hereinafter described. The interior of the casing 4 which I choose to call a rigid casing, is provided with arcuate top and bottom walls and substantially side walls 9. A pneumatic tube 10 of ordinary size and structure is introduced in the casing 4 and its valve stem 11 is projected through the lower wall of the casing and the rim 2 in precisely the same manner as the valve stem in the ordinary vehicle tire.

A vehicle tire casing 12, substantially the same size and structure as the ordinary type of tire casing, is secured upon the periphery of the rigid casing 4 by means of removable rims 13. The rims 13 are held in place by the bolts 8, which bolts take the place of the lug in the ordinary type of removable rim. The upper wall 14 of the casing 4 is provided with a plurality of openings therethrough equal distances apart on the entire periphery of the casing 4. Each of these openings is provided with a metal bearing member 15. A plunger 16, having a stem 17, is slidably mounted by means of its stem in each of the bearings 15. The plunger 16 is provided with an arcuate supporting surface 18 at its upper end having a curvature substantially parallel at a predetermined distance from the curvature of the inner wall of the casing 12. The plunger 16 is further provided with an arcuate shoe 19 at its lower end. The shoe 19 is fashioned to conform with the curvature of the pneumatic tube 10 and is of such width that the shoe may move within the interior of the casing 4 as the plunger 16 is reciprocated.

The stem 17 of the plunger 16 is provided with a longitudinal slot 20 therethrough (see Figure 2). Convoluted resilient rings 21 are disposed in the casing 12, one for each of the plungers 16, and the lower portion 22 of the ring 21 is projected through the slot 20 in the stem 17 of the plunger. The slot therefore serves as a means for positioning the ring 21 in the casing and also permits reciprocation of the plunger.

A plurality of annular spring rings 23 are longitudinally disposed within the casing 12 transverse to the convoluted rings 21. The rings 23 are spaced apart from one another by their introduction to the alternate folds of the ring 21. The ring 21 therefore serves as a spacing member for the rings 23. It should be understood of course that the rings 23 vary in diameter, that is, the rings adjacent the lower end of the plunger are of course of a smaller diameter than the rings adjacent the top of the plunger. The rings 23 and the rings 21 co-act to form a flexible supporting and reenforcing member for the otherwise hollow casing 12.

From the foregoing description of the various parts of the device, the operation thereof may be readily understood. The fundamental principles of my vehicle tire are very much similar to the ordinary vehicle tire in which the tube is disposed immediately adjacent the casing, yet in my improved tire, the tube is remote from the exterior of the casing and therefore is not subjected to possible mutilation or puncture due to the projection of spikes, glass, and the like, through the casing. As the wheel 1 moves upon the road, only a portion of the wheel of course is in actual contact with the road, and the entire weight supported by the wheel is supported at that one particular spot. It would seem therefore after having a knowledge of the construction of my device, that but one or two of the plungers 16 may be immediately over the road at one time and therefore only one of those plungers which are in immediate proximity with the road will move. These plungers will retract in the bearing members 15 and be resisted in their movement by the pneumatic tube 10. This somewhat yielding resistance is precisely the same as is offered in the ordinary type of vehicle tire and possesses all of the important good features of the pneumatic tire. The rings 23, as well as the rings 21, since they are flexible, will follow the contour of the casing 12 as it is compressed immediately over the road, but will immediately return to their normal positions, when that portion of the tire is clear of the road, and instead, different portions of the rings will be distorted. This operation will continue as the vehicle wheel moves over the road and the effect produced intermediate the wheel on the road, will be precisely the same effect as that produced in the ordinary type of pneumatic tire and casing, but without the disadvantages always present in that type of tire.

I claim:

1. A device of the character described comprising a resilient tire casing, a reenforcing frame consisting of a plurality of resilient metal rings disposed within said casing and extending longitudinally thereof at spaced intervals on the inner walls, means for retaining said rings in their adjusted spaced relation with one another relative to the casing wall, a rigid casing for supporting said tire casing, plungers radially and slidably disposed in said rigid casing and arranged to extend and contact said reenforcing frame in said tire casing, and a pneumatic tube supported in said rigid casing, the inner ends of said plunger being arranged to rest on said tube.

2. A device of the character described comprising a resilient tire casing, a reenforcing frame consisting of a plurality of resilient rings disposed within the casing at spaced intervals on the inner wall thereof, and undulated rings disposed transversely to said resilient rings for holding said rings in their adjusted spaced relation relative to one another, a rigid tire casing for supporting said resilient tire casing, plungers radially and slidably disposed in said rigid casing and arranged to extend into said resilient casing and contact the inner walls of said reenforcing frame, and a pneumatic tube disposed in said rigid casing, the inner ends of said plunger being arranged to rest upon said pneumatic tube.

JULIUS T. DORANSKI.